3,524,882
PROCESS FOR THE PREPARATION OF 1,4-N,N'-TETRAMETHYLDIAMINOBUTENE-(2)
Albrecht Moschel, Kelkheim, Taunus, Germany, assignor to Farbwerke Hoechst Aktiengesellschaft vormals Meister Lucius & Bruning, Frankfurt am Main, Germany, a corporation of Germany
No Drawing. Filed Nov. 16, 1967, Ser. No. 683,461
Claims priority, application Germany, Nov. 23, 1966, F 50,732
Int. Cl. C07c 85/16
U.S. Cl. 260—583     4 Claims

ABSTRACT OF THE DISCLOSURE

Improved process for the preparation of 1,4-N,N'-tetramethyldiaminobutene-(2) by reacting 1,4-dichlorobutene-(2) with dimethylamine, in which the reaction is carried out in a two-phase system consisting of an aqueous medium and a hydrocarbon.

---

It is known that 1,4-N,N'-tetramethyldiaminobutene-(2) can be prepared from dimethylamine and 1,4-dibromobutene-(2) or 1,4-dichlorobutene-(2). Thus Willstätter (Ber. 46, page 537 (1913)) used benzene as solvent for the reaction of the very reactive dibromobutene with an excess of dimethylamine, removed from the mixture formed the free base and hydrobromide by extraction with hydrochloric acid, prepared from it the free base and the volatile dimethylamine by addition of strong alkali, and extracted and purified by distillation the base and the dimethylamine. Cromwell and Hassner (J. Am. Chem. Soc. 77, pages 1568–1572 (1955)) reacted the less reactive dichlorobutene with dimethylamine in diethyl ether as solvent, added to the reaction product hydrogen chloride and could thus separate from the reaction product the mixture of the hydrochlorides of the tetramethyldiaminobutene and the dimethylamine in form of crystals. Purification was then effected as usual by recrystallization and conversion into the free base.

Because of the cumbersome and expensive method, the use of readily volatile ethers, the long reaction time and the low crystallization tendency of the hydrochlorides in non-polar solvents which hinder a simplification of the process and an increase in the space-time yield, both possibilities to synthesize are not qualified for the industrial application.

When using polar solvents, such as water or methanol, the reaction velocity, it is true, can be increased. Since, however, the end product does not precipitate from the reaction mixture in crystalline form, excessive trans-alkylations by the dimethylamine occur, and as a consequence polymeric tertiary amines and N-methylpyrolidine become the main product.

Surprisingly, it has been found that the 1,4-N,N'-tetramethyldiaminobutene-(2) can be prepared in a smooth reaction by carrying out the reaction at a temperature within the range of from 20 to 180° C., preferably 50 to 100° C., in a two-phase system consisting of an aqueous medium and a hydrocarbon and then isolating the free base in known way.

In the reaction it is advantageous to use a molar proportion of the 1,4-dichlorbutene-(2) to the dimethylamine of 1:4 to 1:20, preferably 1:6 to 1:14.

Dimethylamine is suitably introduced in form of aqueous solutions. In order to get the space-time yield as high as possible it proved suitable to use saturated aqueous dimethylamine solutions. It is of particular advantage to add further dimethylamine in the aqueous phase under excess pressure of up to 30 atmospheres and to effect the reaction in an autoclave.

The amount of hydrocarbon depends on the volume of the aqueous dimethylamine solution and may amount up to 10–500% by volume, in general 30–100% by volume are preferred.

As hydrocarbons there may be used saturated, monounsaturated as well as aromatic hydrocarbons which are liquid under the reaction conditions and which contain 4 to 10 carbon atoms. Such hydrocarbons are for example n-butane, iso-butane, n-pentane, n-heptane, n-octane, iso-octane, n-decane, cyclopentane, methylcyclopentane, cyclohexane, methylcyclohexane, dimethylcyclohexane, isopropylcyclohexane, 1 - methyl - 4 - isopropylcyclohexane, cyclo-octane, cyclodecane, butenes, pentenes, 4-methylpentene-(1), hexenes, decenes, cyclopentene, cyclohexene, cyclo-octene, benzene, toluene, o-, m- or p-xylene, cumene, p-cymene, ethylbenzene or propylbenzene. Preferably there are used n-hexane, n-heptane, cyclohexane, benzene and toluene.

The reaction may be carried out under normal pressure. In the case that the reaction temperature exceeds the boiling point of the hydrocarbon or the aqueous medium used in each individual case it is a matter of course that the reaction is effected under at least such a pressure which keeps the hydrocarbons and the aqueous medium in liquid phase.

The product of the process is suitably isolated in the following way:

When the reaction is terminated, excess alkali, preferably concentrated aqueous hydroxide solution, is added to the reaction mixture in order to set free the free bases from the hydrochlorides of the amines. The unused dimethylamine which escapes as gas is advantageously absorbed in water. The aqueous dimethylamine solution obtained can be used again. After filtering of the alkali metal salts which may separate, the aqueous phase is separated from the organic phase. When the hydrocarbon is distilled off, the amine obtained is fractionally distilled. The 1,4-tetramethyldiaminobutene-(2) obtained is very pure.

The technical progress of the present invention compared with the processes hitherto known consists of the omission of the cumbersome isolation of a solid intermediate stage with low crystallization tendency. Moreover, the process of the present invention reduces essentially the reaction time and the product is obtained at a higher yield.

The amine obtainable according to the process of the present invention represents a valuable intermediate product. In the production of acetic acid esters from mono- or polyfunctional alcohols and diketenes the amine in form of the free base or the carboxylic acid salts may be also used as extraordinarily effective catalyst.

The following examples are to illustrate the invention but not to limit it thereto.

EXAMPLE 1

2,320 g. of a 40% aqueous dimethylamine solution and 1.1 liter of toluene are introduced into a 3-necked flask provided with a stirrer and a cooler. 312.5 g. of 1,4-dichlorobutene-(2) are added dropwise while briskly stirring within 2 hours at 55–63° C. under strong reflux with the reflux cooler being not more than 0° C. The reaction mixture is then stirred for 10 hours at 65° C. at reflux, then it is cooled and 2 liters of 40% sodium hydroxide solution are added. The escaping dimethylamine is carried off, the sodium chloride is filtered off, the organic phase is separated and the water is azeotropically distilled. The toluene is then removed under normal pressure and the residue is then fractionated on a silver-covered column of 50 cm. with a reflux ratio of 1:3. 268 g. of 1,4-N,N'-tetramethyldiaminobutene-(2) boiling at 74–76° C. under a pressure of 33 mm. of mercury are obtained.

EXAMPLE 2

1,000 g. of a 40% aqueous dimethylamine solution and 1 liter of toluene are introduced into an autoclave having a capacity of 5 liters and then 1.5 liter (=1030 g.) of fluid dimethylamine are added. The mixture is heated to 65° C., the pressure rises very little and stays below 20 atmospheres. Within 2 hours under brisk stirring and at choked external heating 312.5 g. of 1,4-dichlorobutene-(2) are pumped in at 68–72° C. and the pump and capillary tube are evacuated by means of toluene. The batch is reacted for further 2 hours at 75° C., cooled and pressure released. The product is transferred into a separatory funnel, 1 liter of a 40% hydroxide solution is stirred in and the toluene layer is separated. After drying over potassium hydroxide, the toluene is distilled off under normal pressure during which the N-methyl-pyrrolidine obtained as side-product, boiling at 79–80° C./760 mm. of mercury, passes over. The residue is fractioned in vacuo over a silver-covered column. 304 g. (85.5% of theory) of 1,4-N,N'-tetramethyldiaminobutene-(2) boiling at 72–76° C. under a pressure of 33 mm. of mercury are obtained.

I claim:

1. A process for the preparation of 1,4-N,N'-tetramethyldiaminobutene-(2) by reacting 1,4-dichlorobutene-(2) with excess dimethylamine and converting the amino hydrochloride so obtained by treatment with aqueous alkali into the free base, the improvement consisting essentially of reacting in a molar ratio between 1:4 and 1:20 at a temperature between 20° and 180° C. 1,4-dichlorobutene-(2) with dimethylamine in a two-phase system consisting essentially of water and a hydrocarbon which contains 4 to 10 carbon atoms and is liquid under the reaction conditions, isolating the 1,4-N,N'-tetramethyldiaminobutene-(2) in the hydrocarbon layer by phase separation from the two phase system and distillation from said hydrocarbon.

2. The process as claimed in claim 1, wherein the reaction is carried out at a temperature between 50° and 100° C.

3. The process as claimed in claim 1, wherein 1,4-dichlorobutene-(2) and dimethylamine are reacted in a molar ratio between 1:6 and 1:14.

4. The process as claimed in claim 1, wherein hexane, heptane, cyclohexane, benzene or toluene is used as the hydrocarbon.

References Cited

UNITED STATES PATENTS 3,287,411   11/1966   Wakeman et al. _____ 260—585

CHARLES B. PARKER, Primary Examiner

R. L. RAYMOND, Assistant Examiner